(12) United States Patent
Kittler

(10) Patent No.: US 7,436,985 B2
(45) Date of Patent: Oct. 14, 2008

(54) PERSONAL IDENTITY AUTHENTICATION PROCESS AND SYSTEM

(75) Inventor: Josef Kittler, Guildford (GB)

(73) Assignee: Omniperception Limited (GB)

( * ) Notice: Subject to any disclaimer, the term of this patent is extended or adjusted under 35 U.S.C. 154(b) by 939 days.

(21) Appl. No.: 10/296,677

(22) PCT Filed: May 25, 2001

(86) PCT No.: PCT/GB01/02324

§ 371 (c)(1),
(2), (4) Date: Nov. 26, 2002

(87) PCT Pub. No.: WO01/91041

PCT Pub. Date: Nov. 29, 2001

(65) Prior Publication Data

US 2003/0172284 A1    Sep. 11, 2003

(30) Foreign Application Priority Data

May 26, 2000   (GB) ................................. 0013016.1

(51) Int. Cl.
*G06K 9/00* (2006.01)
*G06K 9/62* (2006.01)

(52) U.S. Cl. ....................................... 382/115; 382/224

(58) Field of Classification Search ................. 382/115, 382/118
See application file for complete search history.

(56) References Cited

U.S. PATENT DOCUMENTS

| 5,164,992 | A | * | 11/1992 | Turk et al. | ................... | 382/118 |
|---|---|---|---|---|---|---|
| 5,561,718 | A | * | 10/1996 | Trew et al. | ................... | 382/118 |
| 5,771,307 | A |   | 6/1998 | Lu et al. | | |
| 6,175,818 | B1 | * | 1/2001 | King | .......................... | 704/232 |
| 6,594,629 | B1 | * | 7/2003 | Basu et al. | ................... | 704/251 |
| 6,625,303 | B1 | * | 9/2003 | Young et al. | ................. | 382/132 |
| 6,671,404 | B1 | * | 12/2003 | Kawatani et al. | ............ | 382/190 |

OTHER PUBLICATIONS

Swets, Daniel L., John (Juyang) Weng, Using Discriminant Eigenfeatures for Image Retrieval. Aug. 1996. IEEE Transactions on Pattern Analysis and Machine Intelligence. vol. 18, pp. 831-836.*

Li, Yongping, Josef Kittler. Jiri Matas. Effective Implementation of Linear Discriminant Analysis for Face Recongition and Verifcation. 1999. Proceedings of the 8th International Conference on Computer Analysis of Images and Patterns. vol. 1689. pp. 234-242.*

Etemad, Kamran, Rama Chellappa. Face Recognition Using Discriminant Eigenvectors. 1996. Proceedings of ICASSP'96. pp. 2148-2151.*

Kittler, J. Face Authentication Using Client Specific Fisherfaces. Nov. 1999. http://www.omniperception.com/images/omni_cs_lda_paper.pdf. pp. 1-24.*

(Continued)

*Primary Examiner*—Bhavesh Mehta
*Assistant Examiner*—Manav Seth

(57) ABSTRACT

A personal identity authentication process and system use a class specific linear discriminant transformation to test authenticity of a probe face image. A 'client acceptance' approach, an 'imposter rejection' approach and a 'fused' approach are described.

31 Claims, 2 Drawing Sheets

OTHER PUBLICATIONS

Figure 1B:
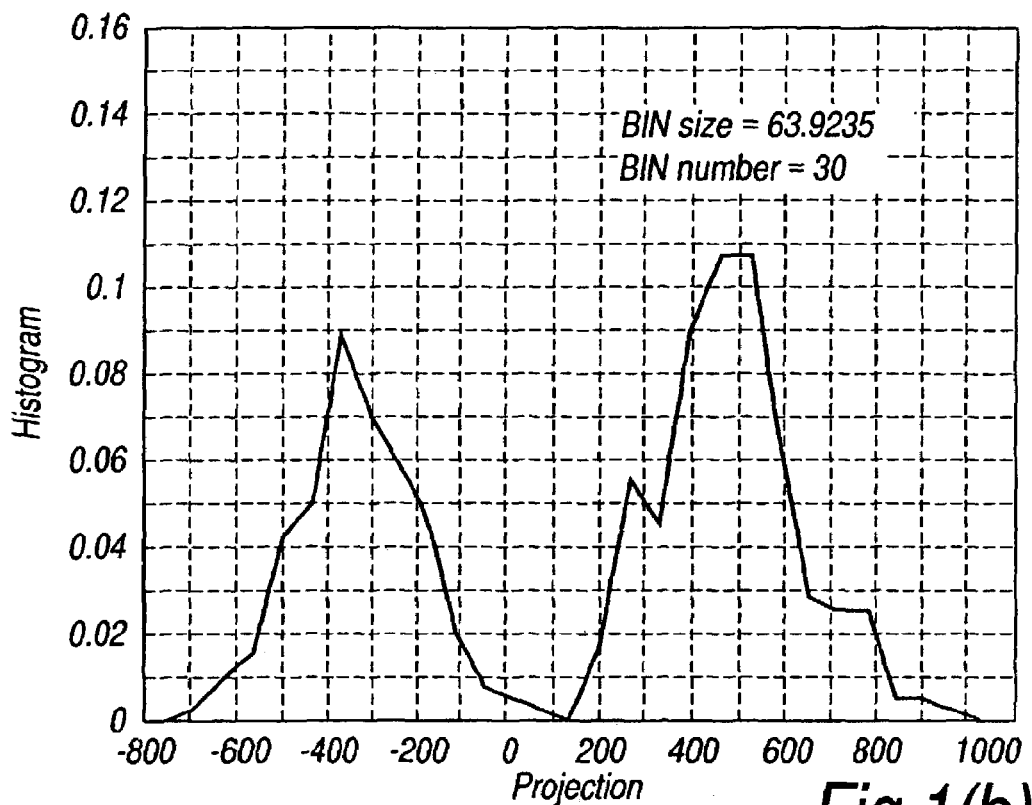

Belhumeur et al., Eigengaces vs. Fisherfaces: Recognition Using Class Specific Linear Projection; IEEE Transactions on Pattern Analysis and Machine Intelligence, Jul. 1, 1997, pp. 711-720; vol. 19, No. 7.

Brunelli et al., Face Recognition Through Geometrical Features, Proc of ECCV 92, pp. 792-800.

Rizvi, et al., The FERET Verification Testing Protocol for Face Recognition Algorithms, IEEE, 1998, pp. 48-53.

Sirovich, et al., Low-Dimensional Procedure for the Characterization of Human Faces, J. Opt. Soc. Am. A., Mar. 1987, vol. 4, No. 3.

Pentland, et al "View-Based and Modular Eigenspaces for Face Recognition", IEEE Intl. Conf. on Computer Vision and Pattern Recognition, 1994, pp. 84-91.

Zhao, et al "Discriminant Analysis of Principal Components for Face Recognition", Face Recognition for Theory to application NATO ASI Series, pp. 73-85.

Swets. et al "Discriminat Analysis and Eigenspace Partition Tree for Face and Object Recognition from Views", IEEE Proceedings of FG 96, 1996, pp. 182-197.

Moghaddam, et al "Probabilistic Visual learning for Object Representation", IEEE Transactions on Pattern Analysis and Machine Intelligence, Jul. 1997, vol. 19, No. 7.

Moghaddam, et al "Beyond Eigenfaces: Probabilistic Matching for Face Recognition", IEEE Proc of Face and Gesture 1998, pp. 30-35.

Kirby et al "Publication of the Karhunen-Loeve Procedure for the characterization of Human Faces", IEEE Transactions on Pattern Analysis and Machine Intelligence, Jan. 1990, vol. 12, No. 1.

Moghaddam, et al "Probabilistic Visual Learning for Object Detection", IEEE Early Visual Learning, 1995.

Lades, et al "Distortion Invariant Object Recognition in the Dynamic Link Architecture", IEEE Transactions on Computers, March, vol. 42, No. 3, pp. 300-311.

Brunelli et al., "Face Recognition: Features versus Templates", IEEE Transactions on Pattern Analysis and Machine Intelligence, vol. 15, No. 10, pp. 1042-1052, Oct. 1993.

Fukunaga, K., "Introduction to Statistical Pattern Recognition", Academic Press, NY: 1990, pp. vii-xi and 34-51.

Messer, et al., "XM2VTSDB: The Extended M2VTS Database", Proc. of AVBPA, pp. 72-77, 1999.

* cited by examiner

PERSONAL IDENTITY AUTHENTICATION PROCESS AND SYSTEM

This invention relates to a personal identity authentication process and system.

The problem of computerized personal identity authentication has received considerable attention over recent years, finding numerous commercial and law enforcement applications.

By way of illustration, these include the verification of credit cards, passports, driver's licenses and the like, matching of controlled photographs such as mud shots, recognition of suspects from CCTV video against a database of known face images and control of access to buildings and teleservices, such as bank teller machines.

A paper entitled "Face Recognition: Features versus Templates" by R Brunelli and T Poggio in IEEE trans on PAMI, Vol 15 pp 1042-1052, 1993 presents a comparison of two basic approaches; namely, a geometric-feature based approach and a template or statistical-feature matching approach, the latter being favoured by the authors.

The most commonly used statistical representation for face authentication is the Karhunen-Loeve expansion, know also as Principal Component Analysis (PCA), by which face images are represented in a lower-dimensional sub-space using PCA bases defined by eigenvectors, often referred to as 'eigenfaces'.

Although this approach provides a very efficient means of data compression, it does not guarantee the most efficient compression of discriminatory information.

More recently, the technique of linear discriminant analysis (LDA) has been adapted to the problem of face recognition. Again, the face images are represented in a lower dimensional sub-space, but using LDA bases defined by eigenvectors which are often referred to as 'fisher faces', and these have been demonstrated to far outperform the PCA representation using 'eigenfaces'. However, conventional LDA representations involve use of multiple, shared 'fisher faces', necessitating complex and computationally intensive matrix operations, and this presents a significant technical problem in terms of performance, processing speed and ease of adding to, or updating the database of face images against which a probe image is tested.

According to a first aspect of the invention there is provided a personal identity authentication process comprising the steps of using linear discriminant analysis (LDA) to derive a class-specific linear discriminant transformation $a_i$ from N vectors $z_j$ (j=1,2 . . . N) defining respective training images, there being m different classes of said training images with the $i^{th}$ classes $\omega_i$ containing a respective number $N_i$ of said training images such that $$N = \sum_{i=1}^{m} N_i,$$

projecting a vector $z_p$ defining a probe image onto said class-specific linear discriminant transformation $a_i$, comparing the projected vector $$a_i^T z_p$$

with a reference vector for the $i^{th}$ class $\omega_i$ and evaluating authenticity of the probe image with respect to the $i^{th}$ class in dependence on the comparison.

According to another aspect of the invention there is provided a personal identity authentication system comprising data storage and data processing means for carrying out the process defined in accordance with said first aspect of the invention.

According to a third aspect of the invention there is provided a personal identity authentication system for evaluating authenticity of a probe image with respect to one or more of m different classes of training images, wherein said training images are defined by respective vectors $z_j$ (j=1,2 . . . N), there being a total of N vectors $z_j$, and the number of training images in the $i^{th}$ class $\omega_i$ is $N_i$ such that $$N = \sum_{i=1}^{m} N_i,$$

the personal identity authentication system comprising data storage means for storing a class-specific linear discriminant $a_i$, as defined in accordance with said first aspect of the invention, for each of said classes $\omega_i$ (i=1,2 . . . m), and data processing means for accessing a said class-specific linear discriminant transformation $a_i$ from said data storage means, projecting a vector $z_p$ defining said probe image onto the accessed class-specific linear discriminant transformation $a_i$, comparing the projected vector $$a_i^T z_p$$

with a reference vector for the $i^{th}$ class $\omega_i$ and evaluating authenticity of the probe image with respect to the $i^{th}$ class $\omega_i$ in dependence on the comparison.

According to year a further aspect of the invention there is provided a computer readable medium containing computer executable instructions for carrying out a process as defined in accordance with said first aspect of the invention.

Figure 1A:
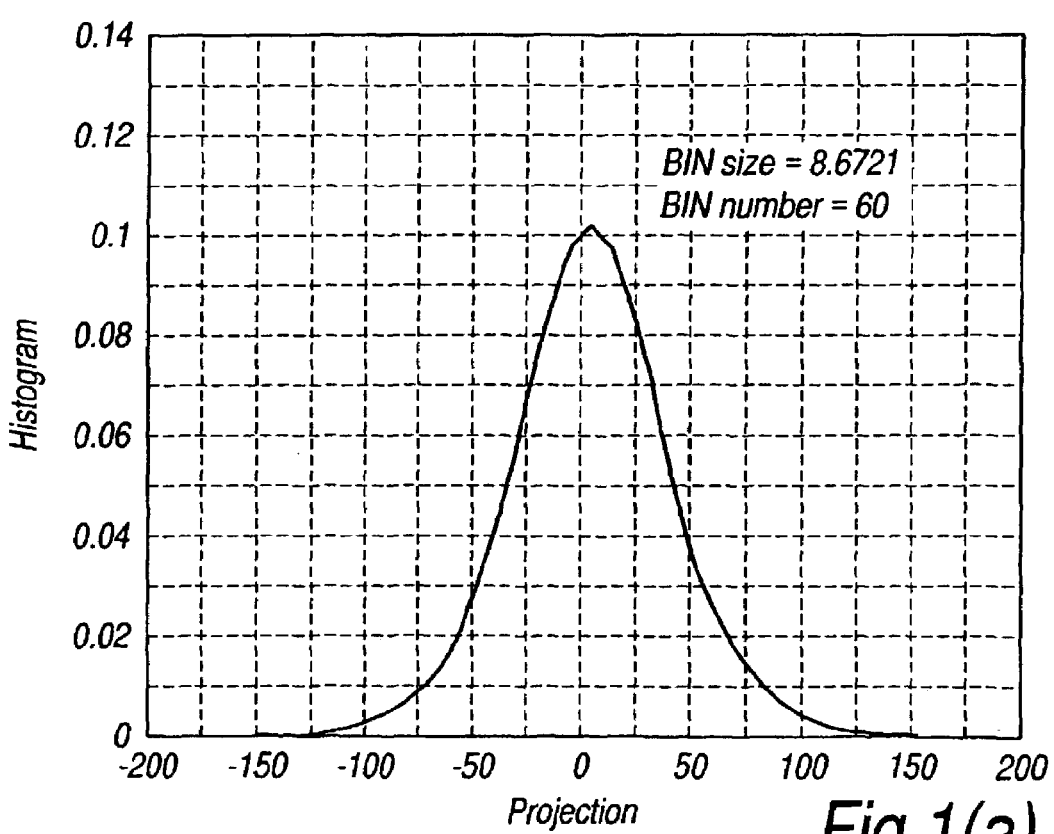
Figure 2:
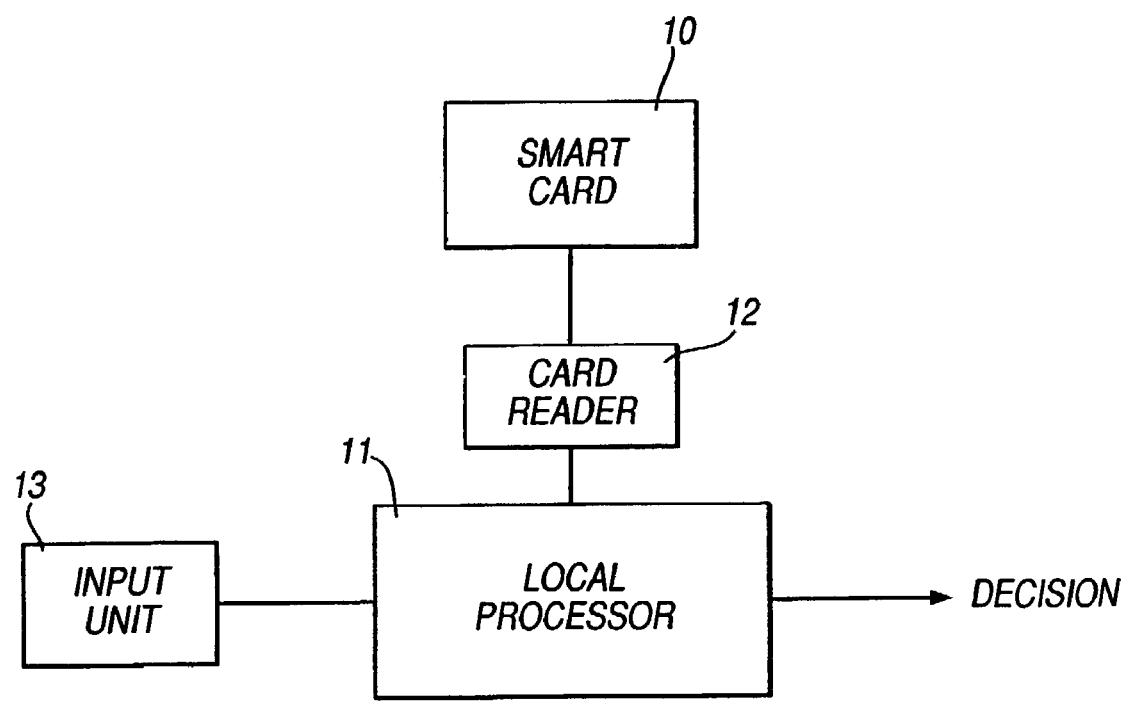

An embodiment of the invention will now be described, by way of example only, with reference to the accompanying drawings of which:

FIG. 1a shows a histogram of a test statistic $t_i$ for projected imposter faces images, FIG. 1b shows a histogram of the same test statistic for projected client face images, and FIG. 2 is a schematic representation of a semi-centralised personal identity authentication system according to the invention.

In this embodiment of the invention, it will be assumed that there is a total of N training images representing m different individuals, referred to herein as 'clients'. The total number of training images N is given by the expression:

$$N = \sum_{i=1}^{m} N_i,$$

where $N_i$ is the number of training images representing the $i^{th}$ client, defining a distinct client class $\omega_i$. The number $N_i$ of training images need not be the same for each client class. Typically, N might be of the order of $10^3$ and m might be of the order $10^2$.

The training images are derived from some biometric data, assumed to be appropriately registered and normalised photometrically.

In this embodiment, frontal face images are used; however, images of other biometric data could alternatively be used—e.g. profile facial images.

As will be explained, the described personal identity authentication process and system can be used to evaluate authenticity of a probe face image presented as being that of one of the clients, either accepting or rejecting the claimed identity. This process finds application, inter alia, in the verification of credit cards, passports, driver's licences and the like.

Each training face image is defined by a two-dimensional D×D array of grey level intensity values which can be thought of as a d-dimensional vector z, where $d=D^2$. Typically, d may be of the order of $2^{14}$ and an ensemble of face images will map into a collection of points within this huge d-dimensional space.

Face images, being similar in overall configuration, will not be randomly distributed within this space, and thus can be defined in terms of a relatively low-dimensional sub-space. Conventionally, the d-dimensional vectors z are projected into a lower dimensional sub-space spanned by the training face images, and this is accomplished using a PCA projection matrix U generated using the aforementioned Principal Component Analysis (PCA).

The projection matrix U is derived form the mixture covariance matrix $\Sigma$, given by the expression:

$$\sum = \sum_{j=1}^{N} (z_j - \mu)(z_j - \mu)^T, \quad (1)$$

where $z_j$ is the d-dimensional vector defining the $j^{th}$ training face image and $\mu$ is the global mean vector given by the expression:

$$\mu = \sum_{j=1}^{N} z_j$$

If, as here, the dimensionality d of the image vectors z is larger than the number of training images N, the mixture covariance matrix $\Sigma$ will have $n \leq N$ non-zero eigenvalues. The respective eigenvectors $u_1, u_2 \ldots u_n$ associated with these non-zero eigenvalues (ranked in order of decreasing size) define the PCA bases used to represent the sub-space spanned by the training face images and, to this end, are used to construct the PCA projection matrix U, which takes the form $$U=[u_1, u_2 \ldots u_n].$$

As described in a paper entitled "Introduction to Statistical Pattern Recognition" by K Fukunaga, Academic Press, New York, 1990 the eigenvalue analysis of the mixture covariance matrix $\Sigma$ may, for reasons of computational convenience, be carried out in a sub-space of dimension d', where d'<d.

Each eigenvector u is of dimension d and will be representative of an image having a face-like appearance, resembling the face images from which it is derived. It is for this reason that the eigenvectors u are sometimes referred to as "eigenfaces".

Having obtained the PCA projection matrix U, the N vectors $z_j$ (j=1,2 . . . N) defining the training face images are projected, after centralization, into the lower-dimensional sub-space spanned by the eigenvectors $u_1, u_2 \ldots u_n$ to generate N corresponding n-dimensional vectors $x_j$, given by the expression:

$$x_j = U^T(z_j - \mu) \text{ for } j=1,2 \ldots N \quad (2)$$

At this stage, it has been hitherto customary to apply linear discriminant analysis (LDA). The LDA bases used to represent the sub-space spanned by the vectors $x_j$ are defined by m−1 eigenvectors $v_1, v_2 \ldots v_{m-1}$ associated with the non-zero eigenvalues of a matrix $\Phi^{-1}S_B$, where $\Phi$ is the mixture covariance matrix of the vectors $x_j$, given by the expression:

$$\Phi = \frac{1}{N}\sum_{j=1}^{N} x_j x_j^T \quad (3)$$

and $S_B$ is the between-class scatter matrix derived from the mean $v_i$ of the projected vectors x in each said client class $\omega_i$, where i=1,2,3 . . . m, and $v_i$ is given by the expression:

$$v_i = \frac{1}{N_i}\sum_{j=1}^{N_i} x_j \text{ for all } x_j \in \omega_i \quad (4)$$

Again, each eigenvector v is representative of an image having a somewhat face-like appearance and is sometimes referred to as a 'fisher face', and these vectors are used to construct a LDA projection matrix $V=[v_1, v_2 \ldots v_{m-1}]$. Adopting the conventional approach, a vector $z_p$ defining a probe face image; that is, face image presented as being that of one of the m clients whose authenticity is to be evaluated, is initially projected into the n-dimensional sub-space defined by the 'eigenfaces' of the PCA projection matrix U and is then projected into the m−1 dimensional sub-space defined by the 'fisher faces' of the LDA projection matrix V to generated a projected vector $y_p$ given by the expression:

$$y_p = V^T U^T(z_p - \mu)$$

Verification, or otherwise, of the claimed identity is then carried out by testing the projected vector $y_p$ against a projected mean $\gamma_i$ for the relevant client class $\omega_i$, where $$\gamma_i = V^T v_i$$

Then, if the projected vector y is within a predetermined distance of the projected mean $\gamma_i$ authenticity of the probe image is accepted as being that of the $i^{th}$ client (i.e. the claimed identity is accepted); otherwise, authenticity of the probe image is rejected as being that of an imposter (i.e. the claimed identity is rejected).

Inspection of Equation 5 above shows that the conventional computational process involves multiple shared 'fisher faces' represented by the eigenvectors $v_1, v_2 \ldots v_{m-1}$ defining the projection matrix V and is always the same regardless of the client class $\omega_i$ against which a probe face image is being tested. this approach is computationally intensive involving complex matrix operations and therefore generally unsatisfactory.

In contrast to this conventional approach, which requires the processing of multiple shared 'fisher faces', the present invention adopts an entirely different approach which involves processing a single, class-specific 'fisher face' defined by a one-dimensional linear discriminant transformation. This approach avoids the use of multiple, shared fisher faces given a considerable saving in computational complexity. To this end, the personal identity of authentication process is redefined in terms of a two-class problem; that is, the client class $\omega_i$ containing the $N_i$ training face images of the $i^{th}$ client and an imposter class $\Omega_i$ based on the $N-N_i$ remaining training face images. Clearly, there will be a client class 107$_i$ and an associated imposter class $\Omega_i$ for each of the m clients (i=1,2 . . . m).

With this formulation, the mean $v_{\Omega_i}$ of the projected vectors x for the imposter class $\Omega_i$ can be expressed as:

$$v_{\Omega_i} = \frac{1}{N-N_i} \sum_{j=1}^{N-N_i} x_j \text{ for all } x_j \notin \omega_i, \tag{7}$$

which, by comparison with Equation 4 above, can be expressed in terms of $v_i$ as $$v_{\Omega_i} = -\frac{N}{N-N_i} v_i \tag{8}$$

Thus, the mean of the $i^{th}$ imposter class $\Omega_i$ is shifted in the opposite direction to the mean of the $i^{th}$ client class $\Omega_i$, the magnitude of the shift being given by the ration of the respective numbers of training face images $N_i$, $N-N_j$ in the two classes. This ratio will normally be small and so the mean of the imposter class $\Omega_i$ will stay close to the origin irrespective of the client class $\Omega_i$ against which a probe face image is being tested.

The between-class scatter matrix $M_i$ for the two classes $\omega_i, \Omega_i$ can be expressed as:

$$M_i = \frac{N-N_i}{N} \left(\frac{N_i}{N-N_i}\right)^2 v_i v_i^T + \frac{N_i}{N} v_i v_i^T, \tag{9}$$

which can be reduced to $$M_i = \frac{N_i}{N-N_i} v_i v_i^T \tag{10}$$

Also, the covariance matrix $\Phi_\Omega$ of the imposter class $\Omega_i$ estimated as:

$$\Phi_\Omega = \frac{1}{N-N_i} \sum_{j=1}^{N-N_i} \left(x_j + \frac{N_i}{N-N_i} v_i\right)\left(x_j + \frac{N_i}{N-N_i} v_i\right)^T \quad x_j \in \omega_i \tag{11}$$

can be expressed in terms of the mixture covariance matrix $\Phi$ by rewriting equation 11 above as $$\Phi_\Omega = \frac{1}{N-N_i} \left[\sum_{j=1}^{N} \left(x_j + \frac{N_i}{N-N_i} v_i\right)\left(x_j + \frac{N_i}{N-N_i} v_i\right)^T - \sum_{j=1}^{N_i} \left(x_j + \frac{N_i}{N-N_i} v_i\right)\left(x_j + \frac{N_i}{N-N_i} v_i\right)^T\right] \tag{12}$$

where the vectors in the second sum belong to the client class. In fact, the second sum is related to the covariance matrix $\Phi_i$ for the client class $\omega_i$, i.e.

$$\Phi_i = \frac{1}{N_i} \sum_{j=1}^{N_i} (x_j - v_i)(x_j - v_i)^T \quad x_j \in \omega_i \tag{13}$$

as $$\sum_{j=1}^{N_i} \left(x_j + \frac{N_i}{N-N_i} v_i\right)\left(x_j + \frac{N_i}{N-N_i} v_i\right)^T = N_i \left[\Phi_i + \left(\frac{N}{N-N_i}\right)^2 v_i v_i^T\right] \tag{14}$$

Thus, simplifying Equation 12 above, it can be shown that:

$$\Phi_\Omega = \frac{1}{N-N_i} \left[N\Phi - N_i\Phi_i - \frac{NN_i}{N-N_i} v_i v_i^T\right] \tag{15}$$

The within-class scatter matrix $\Sigma_i$ for the $i^{th}$ client class is now obtained by a weighted averaging of the covariance matrices of the imposter and client classes i.e.

$$\sum_i = \frac{N-N_i}{N} \Phi_\Omega + \frac{N_i}{N} \Phi_i \tag{16}$$

and by substituting from Equation 15 above, and simplifying, it can be shown that $$\sum_i = \Phi - M_i \tag{17}$$

A class specific linear discriminant transformation $a_i$ for this two class problem can be obtained from the eigenvectors of matrix $$\sum_i^{-1} M_i$$

associated with nonzero eigenvalues. In fact, in this two class problem there is only one such eigenvector $v_i$ that satisfies the equation $$\sum_i^{-1} M_i v_i - \lambda v_i = 0 \quad (18)$$

with $\lambda \neq 0$ provided $v_i$ is non zero. As there is only one solution to the eigenvalue problem it can be easily shown that the eigenvector $v_i$ can be found directly, without performing any eigenanalysis, as $$v_i = \sum_i^{-1} v_i \quad (19)$$

This becomes apparent by substituting for $v_i$ in Equations 18 and 19 above and for $M_i$ from Equation 10 above, i.e.

$$\frac{N_i}{N-N_i} \sum_i^{-1} v_i v_i^T \sum_i^{-1} v_i = \lambda v_i, \quad (20)$$

which also shows that the eigenvalue $\lambda$ is given by $$\lambda = \frac{N_i}{N-N_i} v_i^T \sum_i^{-1} v_i \quad (21)$$

The eigenvector $v_i$ is used as the base for a linear discriminant transformation $a_i$ for the $i^{th}$ client class $\omega_i$ given by the expression:

$$a_i = U v_i, \quad (22)$$

and it is this transformation $a_i$ that defines a one-dimensional, class-specific 'fisher face' used to test the authenticity of a probe image face in accordance with the present invention.

In one approach, referred to herein as "the client acceptance" approach, a vector $z_p$ defining a probe image face is projected onto the class specific 'fisher face' using the transformation $a_i$ and the projected vector $$a_i^T z_p$$

is tested against the projected mean $$a_i^T \mu_i$$

for the respective class (the $i^{th}$ class, in this illustration).

To this end, a difference value $d_c$ given by the expression:

$$d_c = \left| a_i^T z_p - a_i^T \mu_i \right| \quad (23)$$

is computed. If the text statistic $d_c$ is greater than a predetermined threshold, $t_c$ i.e. (if $d_c \leq t_c$) authenticity of the probe face image is accepted i.e. the claimed identity (that of the client $i^{th}$ client) is accepted; otherwise (i.e. $d_c > t_c$) authenticity of the probe face image is rejected i.e. the claimed identity is rejected.

The threshold value $t_c$ is chosen to achieve a specified operating point; that is, a specified relationship between false rejection of true claims and false acceptance of imposter claims. The operating point is determined from the 'receiver operating characteristics' (ROC) curve which plots the relationship between these two error rates as a function of decision threshold. The ROC curve is computed using an independent face image set, know as an evaluation set.

Typically the operating point will be set at the 'equal error rate' (EER) where both the false rejection and false acceptance rates are the same.

In another approach, referred to herein as the 'imposter rejection' approach, the projected vector $$a_i^T z_p$$

is tested against the projected mean of imposters i.e.

$$a^T \mu_\Omega = -\frac{N_i}{N-N_i} a_i^T \mu_i.$$

To this end, a difference value $d_i$ given by the expression:

$$d_i = \left| a_i^T z_p + \frac{N_i}{N-N_i} a_i^T \mu_i \right|$$

is computed. In this case, the projected vector $$a_i^T z_p$$

for an imposter is expected to be close to the projected mean of imposters. this, if the text statistic $d_i$ is greater than a predetermined threshold $t_i$ (i.e. $d_i > t_i$) the authenticity of the probe face image is accepted i.e. the claimed identity (that of the $i^{th}$ client) is accepted; otherwise (i.e. $d_i \leq t_i$) authenticity of the probe face is rejected i.e. the claimed identity is rejected. When the number of training face images N is large the mean of imposters will be close to the origin and the second term in Equation 24 can be neglected. In this case, the difference value $d_i$ will simply be the absolute value of the projected vector $$|a_i^T z_p|.$$

FIGS. 1(a) and 1(b) respectively show histograms of the test statistic $t_i$ for probe face images of imposters and probe face images of clients obtained using the 'imposter rejection' approach. As expected, the probe face images of imposters cluster at the origin. i.e. the mean of imposters $\mu_\Omega$ (FIG. 1(a)), whereas the probe face images of clients fall far away from the origin (FIG. 1(b)). The negative projections in FIG. 1(b) are an artifact of the convention adopted for representing the 'fisher faces'. In principle, though, the projections of client face images could be computed to give a test statistic $t_i$ which is always positive.

It has been found that the 'client acceptance' approach and the 'imposter rejection' approach are complimentary and can be combined or fused. An example of the 'fused' approach is a simple serial fusion scheme. More specifically, a probe face image is initially tested using the 'imposter rejection' approach. If the probe face image fails the test i.e. the claimant is rejected as an imposter, authenticity of the prove face image is accepted. If, on the other hand, the probe face image passes the test i.e. the claimant is accepted as an imposter, the probe face image is tested again using the 'client acceptance' approach. If the probe face image passes this second test i.e. the claimant is accepted as a client, authenticity of the probe face image is accepted; otherwise, authenticity is rejected.

In this illustration, different threshold values $t_c$ and $t_i$ were used for the 'client acceptance' and 'imposter rejection' approaches respectively. However, since the client and imposter probe vectors $z_p$ are both projected into the same one-dimensional space it should be possible to find a common threshold value for both approaches which separate the client and imposter images at given operating point error rates.

The described personal identity authentication processes have been tested by conducting verification experiments according to the so-called Lausanne protocol described in a paper entitled "XM2VTSDB: The Extended M2VTS Database" by K Messer et al Proc of AVBPA '99 pp 72-77, 1999.

This protocol provides a standard frame work for performance characterization of personal identity authentication algorithms so that the results of different approaches are directly comparable. The protocol specifies a partitioning of the database into three different sets; namely, a training set containing 200 clients, an evaluation set containing 200 clients and 25 imposters and a test set containing 200 clients and 70 imposters.

The imposter images in the evaluation and test sets are independent of each other and are distinct from the client set. the training set was used to evaluate the client 'fisher faces', defined by the transformations $a_i$, as already described. The evaluation set was used to determine the thresholds $t_i, t_c$ and the test set was used to evaluate the false acceptance and false rejection rates on independent data.

Prior to testing, the face images were correctly registered to within one pixel to eliminate any contributory affects on performance due to misalignment, and each image was photometrically normalized either by removing image mean or by histogram equalisation.

It has been found that when the 'client acceptance' approach is adopted the optimum results are obtaining using photometrically normalised images, with histogram equalisation giving the best results, whereas when the 'imposter rejection' approach is adopted the optimum results are obtained using images that are unnormalised.

The test results show that the 'imposter rejection' approach gives lower levels of false rejection/false acceptance than the 'client acceptance' approach, and that even lower levels can be achieved using the 'fused' approach, these levels also being lower than levels that can be obtained using conventional LDA authentication processes.

As already described, conventional LDA personal identity authentication processes involve use of multiple, shared 'fisher faces' spanning a sub-space having dimensions of 100 or more, necessitating complex and computationally intensive matrix operations. In contrast to this, the present invention involves use of a class-specific 'fisher face' defined by a transformation $a_i$ which only occupies a one-dimensional sub-space. This has important implications for computational efficiency of the authentication process; more specifically, because computational complexity in the operation phase (i.e. after the 'fisher faces' have been generated) is linearly proportional to sub-space dimensionality, the class-specific approach of the present invention should operate at more than 100 times faster than the conventional approach.

Moreover, because the test statistics $d_c, d_i$ are one-dimensional there is no need to compute a Euclidean distance in 'fisher space'—a decision can be reached by a simple comparison of the test statistic $d_c, d_i$ with a threshold $t_c, t_i$, giving further computational gains. Furthermore, the projections of client and imposter mean $$\left(a_i^T \mu_p - \frac{N_i}{N - N_i} a_i^T \mu_i\right)$$

can be pre-computed and, again, this leads to faster processing.

Also, during the training phase, the class-specific 'fisher faces' a can be evaluated in a relatively straightforward manner, without the need to solve an eigenvalue analysis problem. This is particularly so when the number N of training face images is large; then, the between-class scatter matrix $M_i$ tends to zero and the within-class scatter matrix $$\sum_i$$

simply becomes the mixture covariance matrix $\Phi$ which is common to all classes, giving yet further computational gains.

A further consequence of using a class-specific 'fisher face' $a_i$, as described, is that each such 'fisher face' can be computed and independently of any other 'fisher face'. This makes enrollment of new clients relatively straightforward compared with the above-described conventional LDA approach involving use of multiple, shared 'fisher faces'. Therefore, the present invention finds particular, though not exclusive, application in situations where the client population is continuously changing and the database of training face images need to be added to or updated.

The personal identity authentication process of the invention ay be implemented in a variety of different ways.

In a fully centralised personal identity authentication system a probe face image is transmitted to a remove control processing station which stores details of all the clients and carried out the necessary processing to arrive at a decision as to authenticity.

Alternatively, a semi-centralised system could be used, as shown schematically in FIG. 2. In this case, class specific data; e.g. the eigenvectors $v_1, v_2 \ldots v_m$ and the mean vectors $\mu_1, \mu_2 \ldots \mu_m$ are pre-computed and stored in a remove data store e.g. a portable data store such as a smart card 10, and the data processing is carried out in a local processor 11. The local processor 11 stores the bases $u_1, u_2 \ldots u_m$ for the PCA projection matrix U and accesses data from the smart card 10, as necessary, via a card reader 12. The processor 11 uses this data to process a vector $z_p$ representing a probe face image received from an associated input unit 13.

In a yet further approach, a fully localised system could be used. In this case, all the necessary data is stored and processed in a smart card. With this approach, the present invention which involves processing class-specific 'fisher faces' $a_i$ should be m times more efficient than the conventional LDA approach which involves processing multiple, shared 'fisher faces', both in terms of data storage and processing speed.

Furthermore, enrollment of new clients in, or updating of the smart card database, impractical using the conventional LDA approach, becomes feasible. Therefore, the present invention opens the possibility of personal identity authentication systems having non-centralised architectures.

In the foregoing implementations of the invention, the probe face image is presented as being that of one of m clients know to the authentication system, and this image is tested against the respective client class. In another implementation of the invention, the identity of the probe face image is unknown; in this case, the probe face image is tested against one or more of the client classes with a view to finding a match and establishing identity. This implementation finds application, inter alia, in matching of controlled photographs such as mug shots and recognition of suspects from CCTV video against a database of known face images.

It will be understood that the invention also embraces computer readable media such as CD ROM containing computer executable instructions for carrying out personal identity authentication processes according to the invention.

The invention claimed is:

1. A personal identity authentication process comprising the steps of:
    using linear discriminant analysis (LDA) to derive a class-specific linear discriminant transformation $a_i$ from N vectors $z_j$ (j=1,2 ... N) defining respective training images, there being m different client classes of said training images, each said client class containing training images of a single client, with the $i^{th}$ class $\omega_i$ containing a respective number $N_i$ of said training images such that $$N = \sum_{i=1}^{m} N_i,$$

projecting a vector $z_p$ defining a probe image onto said class-specific linear discriminant transformation $a_i$,
    comparing the projected vector $$a_i^T z_p$$

with a reference vector for the $i^{th}$ client class $\omega_i$ and
    evaluating authenticity of the probe image with respect to the $i^{th}$ client class in dependence on the comparison.

2. A process as claimed in claim 1 including,
    applying principal component analysis (PCA) to said vectors $z_j$ (j=1,2 ... N) to generate a set of eigenvectors $(u_1, u_2 ... u_n)$, spanning an n-dimensional sub-space, as bases for a PCA projection matrix U,
    using said PCA projection matrix U to project said vectors $z_j$ (j=1,2 ... N) onto said eigenvectors $(u_1, u_2 ... u_n)$ to generate respective n-dimensional vectors $x_j$ (j=1,2 ... N), and
    applying said linear discriminant analysis (LDA) to said n-dimensional vectors $x_j$ (j=1,2 ... N) to generate a class-specific eigenvector $v_i$ related to said class-specific linear discriminant transformation $a_i$ by the expression $a_i = U v_i$.

3. A process as claimed in claim 2 wherein said step of applying said linear discriminant analysis (LDA) to said n-dimensional vectors $x_j$ (j=1,2 ... N) includes generating a within-class scatter matrix $$\Sigma_i$$

for said $i^{th}$ client class $\omega_i$, and said class-specific eigenvector $v_i$ is given by the expression:

$$v_i = \Sigma^{-1} \bar{v}_i$$

where $$\bar{v}_i = \frac{1}{N_i} \sum_{j=1}^{N_i} x_j$$

for all $x_j$ in $\omega_i$.

4. A process as claimed in claim 3 wherein said within-class scatter matrix $$\Sigma_i$$

is equal to the mixture covariance matrix $\Phi$ of said n-dimensional vectors $x_j$ (j=1,2 ... N) where, $$\Phi = \frac{1}{N} \sum_{j=1}^{N} x_j x_j^T.$$

5. A process as claimed in claim 3 wherein said step of applying said linear discriminant analysis (LDA) to said n-dimensional vectors $x_j$ (j=1,2 ... N) includes generating a between-class scatter matrix $M_i$ for said $i^{th}$ client class, where $$M_i = \frac{N_i}{N - N_i} \bar{v}_i \bar{v}_i^T,$$

and $$\bar{v}_i = \frac{1}{N_i} \sum_{j=1}^{N_i} x_j$$

for all $x_j$ in $\omega_i$
    generating the covariance matrix $\Phi$ of said n-dimensional vectors $x_j$ (j=1,2 ... N), where $$\Phi = \frac{1}{N} \sum_{j=1}^{N} x_j x_j^T$$

and generating said within-class scatter matrix $$\Sigma_i$$

given by $$\Sigma_i = \Phi - M_i.$$

6. A process as claimed in any one of claims 1 to 5 wherein said reference vector is defined as $$a_i^T \mu_i,$$

where $$\mu_i = \frac{1}{N_i} \sum_{i=1}^{N_i} z_i$$

for all $z_i$ in $\omega_i$.

7. A process as claimed in claim 6 wherein said step of evaluating includes evaluating a difference value $d_c$ given by $$d_c = |a_i^T z_p - a_i^T \mu_i|$$

and accepting or rejecting authenticity of the probe image in dependence on said difference value.

8. A process as claimed in claim 7 including accepting authenticity of said probe image if $d_c \leq t_c$ and rejecting authenticity of said probe image if $d_c > t_c$, where $t_c$ is a predetermined threshold value.

9. A process as claimed in claim 6 wherein said step of evaluating includes evaluating a difference value $d_i$ given by $$d_i = \left| a_i^T z_p + \frac{N_i}{N - N_i} a_i^T \mu_i \right|$$

and accepting or rejecting authenticity of the probe image in dependence on said difference value.

10. A process as claimed in claim 9 including accepting authenticity of said probe image if $d_i > t_i$ and rejecting authenticity of the probe image if $d_i \leq t_i$, where $t_i$ is a predetermined threshold value.

11. A process as claimed in claim 7 wherein said step of evaluating includes evaluating said difference value $d_i$ given by $$d_i = \left| a_i^T z_p + \frac{N_i}{N - N_i} a_i^T \mu_i \right|$$

and accepting or rejecting authenticity of the probe image in dependence on said difference value, and further includes evaluating said difference value $d_i$, accepting authenticity of said probe image if $d_i > t_i$, where $t_i$ is a predetermined threshold value, evaluating said difference value $d_c$ if $d_i \leq t_i$, accepting authenticity of the probe image if $d_c \leq t_c$, and rejecting authenticity of the probe image if $d_c > t_c$ where $t_c$ is a predetermined threshold value.

12. A process as claimed in claim 11 wherein said predetermined threshold value(s) $t_c$, $t_i$ are the same.

13. A process as claimed in claim 1 including deriving a respective said class-specific linear discriminant transformation $a_i$ for each of said m client classes, and performing said steps of projecting, comparing and evaluating for at least one of the class-specific linear discriminant transformations $a_i$ so derived.

14. A process as claimed in 1 including enrolling a new client class of training images containing $N_{m+1}$ training images as the $m+1^{th}$ client class and applying the process of claim 1 to the N' vectors $z_j$ (j=1,2 ... N') defining respective training images, where N'=N+$N_{m+1}$.

15. A process as claimed in claim 14 including updating said class-specific linear transformation $a_i$ to take account of said new class.

16. A personal identity authentication process comprising the steps of:
providing a class-specific linear discriminant transformation $a_i$ derived by applying linear discriminant analysis (LDA) to N vectors $z_j$ (j=1,2 ... N) defining respective training images, there being m different client classes of said training images, each said client class containing training imager or a single client with the $i^{th}$ client class $\omega_i$ containing a respective number $N_i$ of said training images such that $$N = \sum_{i=1}^{m} N_i,$$

projecting a vector $z_p$ defining a probe image onto said class-specific linear discriminant transformation $a_i$,
comparing the projected $$a_i^T z_p$$

with a reference vector for the $i^{th}$ client class $\omega_i$ and
evaluating authenticity of the probe image with respect to the $i^{th}$ client class in dependence on the comparison.

17. A personal identity authentication process as claimed in claim 16 wherein said class-specific linear discriminant transformation $a_i$ is derived using the following steps:
applying principal component analysis (PCA) to said vectors $z_j$ (j=1,2 ... N) to generate a set of eigenvectors $(u_1, u_2, \ldots u_n)$, spanning an n-dimensional sub-space, as bases for a PCA projection matrix U,
using said PCA projection matrix U to project said vectors $z_j$ (j=1,2 ... N) onto said eigenvectors $(u_1, u_2 \ldots u_n)$ to generate respective n-dimensional vectors $x_j$ (j=1,2 ... N), and
applying said linear discriminant analysis (LDA) to said n-dimensional vectors $x_j$ (j=1,2 ... N) to generate a class-specific eigenvector $v_i$ related to said class-specific linear discriminant transformation $a_i$ by the expression $a_i = U v_i$.

18. A personal identity authentication process comprising the steps of:
providing a class-specific linear discriminant transformation $a_i$ derived by applying linear discriminant analysis (LDA) to N vectors $z_j$ (j=1,2 ... N) defining respective training images, there being m different client classes of said training images, each said client class containing training images of a single client with the $i^{th}$ client class $\omega_i$ containing a respective number $N_i$ of said training images such that $$N = \sum_{i=1}^{m} N_i,$$

projecting a vector $z_p$ defining a probe image onto said class-specific linear discriminant transformation $a_i$, comparing the projected $$a_i^T z_p$$

with a reference vector for the $i^{th}$ client class $\omega_i$, wherein said reference vector is defined as $$a_i^T \mu_i,$$

where $$\mu_i = \frac{1}{N_i} \sum_{i=1}^{N_i} z_i,$$

for all $z_i$ in $\omega_i$, and evaluating the authenticity of the probe image with respect to the $i^{th}$ client class in dependence on the comparison, said step of evaluating being carried out by the process steps defined in claim 7 or claim 9.

19. A personal identity authentication system comprising data storage and data processing means for carrying out the process according to claim 1.

20. A personal identity authentication system for evaluating authenticity of a probe image with respect to one or more of m different clients classes of training images, each said client class containing training images of a single client, wherein said training images are defined by respective vectors $z_j$ (j=1,2 ... N), there being a total of N vectors $z_j$, and the number of training images in the $i^{th}$ client class $\omega_I$ is $N_i$ such that $$N = \sum_{i=1}^{m} N_i,$$

the personal identity authentication system comprising
- data storage means for storing a class-specific linear discriminant transformation $a_i$, as defined in claim 1, for each of said client classes $\omega_i$ (i=1,2 ... m), and
- data processing means for accessing a said class-specific linear discriminant transformation $a_i$ from said data storage means, projecting a vector $z_p$ defining said probe image onto the accessed class-specific linear discriminant transformation $a_i$, comparing the projected vector $$a_i^T z_p$$

with a reference vector for the $i^{th}$ client class $\omega_i$ and evaluating authenticity of the probe image with respect to the $i^{th}$ client class $\omega_i$ in dependence on the comparison.

21. An authentication system as claimed in claim 20 wherein said reference vector is defined as $$a_i^T \mu_i,$$

where $$\mu_i = \sum_{i=1}^{N_i} z_i$$

for all $z_i$ in $\omega_i$ and is also stored in said data storage means and is accessible by said data processing means.

22. An authentication system as claimed in claim 21 wherein said step of evaluating includes evaluating a difference value $d_c$ given by $$d_c = |a_i^T z - a_i^T \mu_i|,$$

and accepting or rejecting authenticity of the probe image in dependence on said difference value.

23. An authentication system as claimed in claim 22 including accepting authenticity of said probe image if $d_c \leq t_c$ and rejecting authenticity of said probe image if $d_c > t_c$, where $t_c$ is a predetermined threshold value.

24. An authentication system as claimed in claim 21 wherein said step of evaluating includes evaluating a difference value $d_i$ given by $$d_i = \left| a_i^T z_p + \frac{N_i}{N - N_i} a_i^T \mu_i \right|$$

and accepting or rejecting authenticity of the probe image in dependence on said difference value.

25. An authentication system as claimed in claim 24 including accepting authenticity of said probe image if $d_i > t_i$ and rejecting authenticity of said probe image if $d_i \leq t_i$, where $t_i$ is a predetermined threshold value.

26. An authentication system as claimed in claim 22 wherein said step of evaluating includes evaluating a difference value $d_i$ given by $$d_i = \left| a_i^T z_p + \frac{N_i}{N - N_i} a_i^T \mu_i \right|$$

and accepting or rejecting authenticity of the probe image in dependence on said difference value, and further includes evaluating said difference value $d_i$, accepting authenticity of said probe image if $d_i > t_i$, where t is a predetermined threshold value, evaluating said difference value $d_c$ if $d_i \leq t_i$,
accepting authenticity of the probe image if $d_c \leq t_c$ and
rejecting authenticity of the probe image if $d_c > t_c$, where $t_c$ is a predetermined threshold value.

27. An authentication system as claimed in claim 20 wherein said data storage means and said data processing means are located at different sites.

28. An authentication system as claimed in claim 27 wherein said data storage means is portable.

29. An authentication system as claimed in claim 28 wherein said data storage means is a smart card.

30. An authentication system as claimed in claim 20 wherein said data storage means stores precomputed data.

31. A computer readable medium containing computer executable instructions for carrying out the steps defined in claim 1.

* * * * *